(12) United States Patent
Paquelet

(10) Patent No.: US 7,539,234 B2
(45) Date of Patent: May 26, 2009

(54) SYSTEM AND DEVICE FOR MODULATING UWB PULSE SEQUENCES

(75) Inventor: Stephane Paquelet, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 648 days.

(21) Appl. No.: 10/950,505

(22) Filed: Sep. 28, 2004

(65) Prior Publication Data

US 2005/0195887 A1    Sep. 8, 2005

(30) Foreign Application Priority Data

Oct. 21, 2003    (EP)    ................... 03292627

(51) Int. Cl.
*H04B 1/02*    (2006.01)
(52) U.S. Cl. .................................... 375/130
(58) Field of Classification Search ................ 375/295, 375/297, 300, 316, 320, 321, 130, 135, 146, 375/237–239, 242, 265; 331/1 R, 15, 16, 331/107 R, 108 R, 109; 342/175, 202, 203, 342/204; 332/106, 109, 112, 115
See application file for complete search history.

(56) References Cited

U.S. PATENT DOCUMENTS

| 3,808,365 | A | * | 4/1974 | Ehrat | ........................ 380/47 |
| 4,214,126 | A | * | 7/1980 | Wipff | ....................... 380/252 |
| 4,600,942 | A | * | 7/1986 | Field et al. | .................. 380/215 |
| 4,714,924 | A | * | 12/1987 | Ketzler | .................. 340/825.21 |
| 5,349,612 | A | * | 9/1994 | Guo et al. | .................... 375/371 |
| 5,610,907 | A | | 3/1997 | Barrett | |
| 5,677,927 | A | | 10/1997 | Fullerton et al. | |
| 5,713,931 | A | * | 2/1998 | Paul et al. | ..................... 607/27 |
| 5,726,658 | A | * | 3/1998 | Auslander et al. | ........... 342/204 |
| 7,042,968 | B1 | * | 5/2006 | Jansen et al. | ................. 375/347 |
| 2004/0141547 | A1 | | 7/2004 | Paquelet | |
| 2006/0025086 | A1 | * | 2/2006 | Dore et al. | .................. 455/102 |
| 2006/0198425 | A1 | * | 9/2006 | Froc | ........................... 375/130 |
| 2006/0226916 | A1 | * | 10/2006 | Florescu et al. | ............... 331/16 |

FOREIGN PATENT DOCUMENTS

EP    0 896 433 A2    2/1999
WO    WO 01/97396 A2    12/2001

* cited by examiner

*Primary Examiner*—Young T. Tse
(74) *Attorney, Agent, or Firm*—Oblon, Spivak, McClelland, Maier & Neustadt, P.C.

(57) ABSTRACT

The present invention relates to a system for transmitting data in the form of at least one sequence of pulses. A transmitter included in the system according to the invention comprises symbol encoding means ENC including at least one pulse generator PLSG, and at least one signal multiplier SGMk (for k=1 to K) for multiplying at least one pulse sequence Psqk with a tunable coding value defined by a control word WDk. By virtue of the invention, the information carried by a transmitted signal Tsg will essentially be represented by the power carried by at least one pulse sequence included in said signal Tsg, which power is related to the amplitude of the pulses. This information may then be recovered by a receiver without said receiver having to map precisely, with respect to time, the received pulse sequences.

10 Claims, 3 Drawing Sheets

SYSTEM AND DEVICE FOR MODULATING UWB PULSE SEQUENCES

BACKGROUND OF THE INVENTION

The present invention relates to a telecommunication system including at least one transmitter and one receiver, said transmitter being intended to transmit a signal formed by at least one pulse sequence of Ns pulses over Ns time windows, each pulse being enclosed within a time chip whose position within its relevant time window is defined by a chip number.

Data transmission methods using encoded pulse sequences are currently studied with the aim of assessing the relevance of so-called Ultra-Wide Band telecommunication systems (further referred to as UWB systems). In such a system, each transmitter may be identified by a signature formed by the above-mentioned chip numbers, which signature is in itself quite sturdy and may thus be reliably and accurately communicated to all potential receivers.

The pulses used in UWB systems are very short, having for example a duration lower than 0.1 nanosecond, which offers to such systems bandwidths at least as large as 10 GigaHertz, entailing high flexibility and hence numerous possible applications for such systems.

BRIEF SUMMARY OF THE INVENTION

The above-described signal may form a carrying signal on which information can be encoded by modulation of said carrying signal. The inventors have observed that, because of the shortness of the pulses involved, a precise synchronization with a given pulse sequence will be difficult to perform at the receiver end, so that the chosen modulation scheme should involve as few time-related parameters as possible in order to be cost-efficient.

The present invention thus aims at providing a modulation scheme according to which the information carried by pulse sequences may be recovered at the receiver end without requiring a precise mapping, with respect to time, of the received pulse sequences.

Indeed, a telecommunication system as described in the opening paragraph is characterized according to the invention in that the transmitter comprises symbol encoding means including:

at least one pulse generator for producing said at least one pulse sequence, and
  at least one signal multiplier for multiplying said at least one pulse sequence produced by the pulse generator with a tunable coding value representative of a symbol to be carried by said pulse sequence.

Thanks to such symbol encoding means, the information carried by signals transmitted in an Ultra-Wide Band telecommunication system according to the invention may essentially be represented by the power carried by these signals, which power is related to the amplitude of the pulses included within such a signal.

The signal multiplier may be built on the basis of a Gilbert cell, which is a simple and well-known analog circuit designed for mixing together two analog signals by means of three differential pairs of transistors. The tunable coding value may be greater than one, in which case the signal multiplier will act as an amplifier. The tunable coding value may also be smaller than one, in which case the signal multiplier will act as an attenuator or divider.

According to an advantageous embodiment of the invention, in which said at least one pulse sequence consists in a voltage signal having a predetermined amplitude, and the tunable coding value is smaller than or equal to one, the signal multiplier includes a voltage divider intended to divide said predetermined amplitude by a value which is tunable by means of a control word representative of the coding value.

As will be explained hereinafter, such a voltage divider may be implemented quite cheaply by using passive components, such as a dividing bridge formed by series-arranged resistors.

According to a first variant of the invention, the symbol encoding means further include a random binary generator for randomly generating values equal to +1 or −1 with which successive pulses of a pulse sequence are to be multiplied.

This first variant of the invention enables to obtain a random distribution of positive and negative pulses, which does not affect the information carried by said pulses because said information is related to the square of said pulses, but allows to prevent appearance of high-amplitude peaks in the spectral domain, which peaks could interfere with equipment not included in the telecommunication system. Such frequency interference should be limited as a rule, and is targeted by a European Commission Directive 83/336 CEE, as well as by regulation of the USA's Federal Communications Commission.

According to a second variant of the invention, the symbol encoding means further include time-delaying means for subjecting all pulses of a same pulse sequence to a time jitter.

Such a time-jitter will preferably be kept small with respect to a delay spread which will be induced by a communication channel through which the modulated signal will be transmitted. This time-jitter does not affect the information carried by the pulse sequences, and mainly adds an additional degree of flexibility to the modulation scheme according to the invention.

Though pulses of a same sequence may have different shapes, provided that they all have essentially a same width and carry a same quantity of energy, the choice of a same shape for all pulses belonging to a same sequence enables to simplify the implementation of the modulation scheme according to the invention. The pulses may for example have a shape defined as a derivative of the second order of a Gaussian function. Other pulse shapes known to those skilled in the art may, of course, be used in this same purpose.

According to a particular embodiment of the invention, the transmitter includes at least one signal encoder comprising a single pulse generator and energy splitting means for dispatching a single basic pulse sequence delivered by said single pulse generator into at least two specific sequences to be transmitted within respective frequency sub-bands into which a total bandwidth available for transmission is divided by filtering means, said encoder further comprising at least two signal multipliers for multiplying each specific pulse sequence with a tunable coding value representative of a symbol to be carried by said specific pulse sequence, said encoder also including signal combination means for combining all specific sequences delivered by all signal multipliers into a signal to be transmitted.

This particular embodiment of the invention enables to transmit simultaneously several symbols through a same communication channel, and thus to significantly increase the throughput of the telecommunication system. This particular embodiment is also remarkable in that each signal encoder, though including a single pulse generator, is able to generate multiple encoded pulse sequences.

According to a variant of this embodiment, all signal multipliers included in a same signal encoder will preferably be essentially identical to each other, at least two signal multipliers being controllable by a same control word in order to produce information redundancy on at least two different sub-bands.

This variant of the above described embodiment of the invention will enable to easily introduce transmission redundancy in cases where a communication channel to be used for said transmission has been identified as featuring a low signal-to-noise ratio. Thanks to the identity of the signal multipliers, a proper choice of the number of identical control words to be used during the encoding will suffice for applying a proper degree of redundancy, somewhat similar to a transmission power level, computed on the basis of a measurement of the signal-to-noise ratio related to the relevant communication channel. This variant thus allows a simple and flexible tuning of the throughput of an UWB telecommunication system as a function of the quality of the communication conditions within said system.

According to another of its hardware-oriented aspects, the invention also relates to a device intended to transmit a signal formed by at least one sequence of Ns pulses over Ns time windows, each pulse being enclosed within a time chip whose position within its relevant time window is defined by a chip number, which device comprises symbol encoding means including:

at least one pulse generator for producing said at least one pulse sequence, and
  at least one signal multiplier for multiplying said at least one pulse sequence produced by the pulse generator with a tunable coding value representative of a symbol to be carried by said pulse sequence.

BRIEF DESCRIPTION OF THE SEVERAL VIEWS OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

Figure 1:
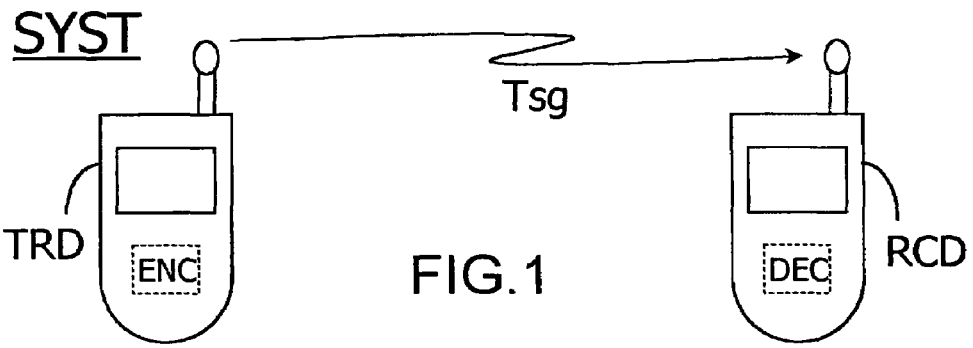
FIG. 1 is a block diagram depicting a telecommunication system in which the invention is used.

FIG. 1 depicts a telecommunication system SYST in which the present invention is embodied. This system SYST includes at least one transmitter TRD and one receiver RCD, which may for example be both constituted by devices such as mobile phones. The transmitter TRD is intended to transmit a signal Tsg formed by at least one sequence of Ns pulses pj (for j=1 to Ns) over Ns time windows Tf, each pulse being enclosed within a time chip Tc whose position within its relevant time window is defined by a chip number cj (for j=1 to Ns). The number Ns of pulses included in this sequence may, for example, be chosen equal to 128, while the width of each time window Tf may be chosen equal to 100 nanoseconds, with a width of 1 nanosecond for each time chip Tc.

According to the present invention, the transmitter TRD includes symbol encoding means ENC intended to multiply each pulse sequence by a coding value representative of a symbol to be carried by said pulse sequence.

The information carried by the transmitted signal Tsg may thus essentially be represented by the power carried by this signal Tsg, which power is related to the amplitude of the pulses included within said signal Tsg. This information may then be recovered by the receiver RCD without said receiver RCD having to map precisely, with respect to time, the received pulse sequences.

Figure 2:
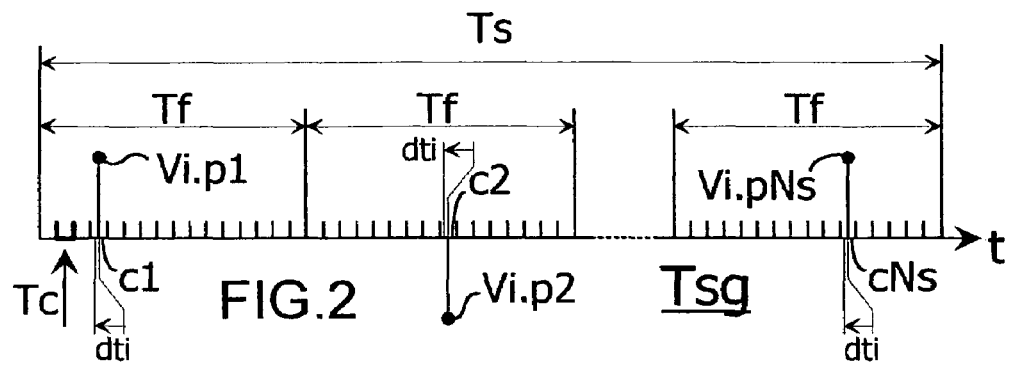
FIG. 2 is a chronogram depicting a pulse sequence constituting a carrying signal transmitted in such a telecommunication system.

FIG. 2 depicts such a transmitted signal Tsg in the form of a chronogram, according to which each pulse sequence has a total duration Ts divided into time windows having each a duration Tf, each time window being sub-divided into time chips Tc, a single time chip within each window being intended to enclose a pulse pj (for j=1 to Ns), which single time chip is identified by means of a chip number cj. The transmitter of this transmitted signal Tsg will thus be identified by a signature $Sg=(c1, c2 \ldots cNs)$ jointly formed by all above-mentioned chip numbers cj) for j=1 to Ns), which signature Sg is in itself quite sturdy and may thus be reliably and accurately communicated to all potential receivers.

In accordance with the invention, each pulse pj (for j=1 to Ns) belonging to the pulse sequence shown in this picture has been multiplied by a same tunable coding value Vi representative of a symbol to be carried by said pulse sequence, in the form of the power carried by this sequence, the reference "i" being indicative of a reference number allocated to the pulse sequence under consideration.

Furthermore, the pulses pj (for j=1 to Ns) are multiplied by values $\alpha j$ which are randomly chosen equal to +1 or −1 in the course of the symbol encoding step, so that in the example shown here, the second pulse p2 is negative.

Such a random distribution of positive and negative pulses, which does not affect the information carried by said pulses because said information is related to the squares of said pulses, allows to prevent appearance of high-amplitude peaks in the spectral domain.

All pulses pj (for j=1 to Ns) of the pulse sequence shown here may additionally be submitted to a time jitter dti in the course of the symbol encoding step.

The time-jitter introduced by the time-delaying means will be kept small with respect to a delay spread which will be induced by a communication channel through which the modulated signal will be transmitted. The delay spread may have, for example, a value of 100 nanoseconds. Such a time-jitter won't affect the information carried by each pulse sequence, and mainly adds an additional degree of flexibility to the modulation scheme according to the invention.

The transmitted signal Tsg may thus be expressed in the following form:

$$Tsg(t) = \sum_{i,j} Vi \cdot \alpha j \cdot pj(t - cj - j \cdot Tf - dti)$$

In an alternative embodiment of the invention not shown here, the transmitted signal Tsg may be constituted by a superimposition of a predetermined number of pulse sequences, each pulse sequence having been subjected to a symbol encoding step and corresponding to one of several sub-bands into which a total bandwidth available for transmission has previously been divided.

In such an embodiment, each pulse sequence corresponding to a given sub-band of rank k (with k=1 to K where K is the total number of sub-bands) will be expressed as:

$$Tsgk(t) = \sum_{i,j} Vki \cdot akj \cdot pkj(t - ckj - j \cdot Tf - dtki),$$

with $$Tsg(t) = \sum_{k} Tsgk(t)$$

This variant of the invention enables to transmit simultaneously several symbols through a same communication channel, and thus to significantly increase the throughput of a telecommunication system in which such a variant of the invention is embodied.

Figure 3:
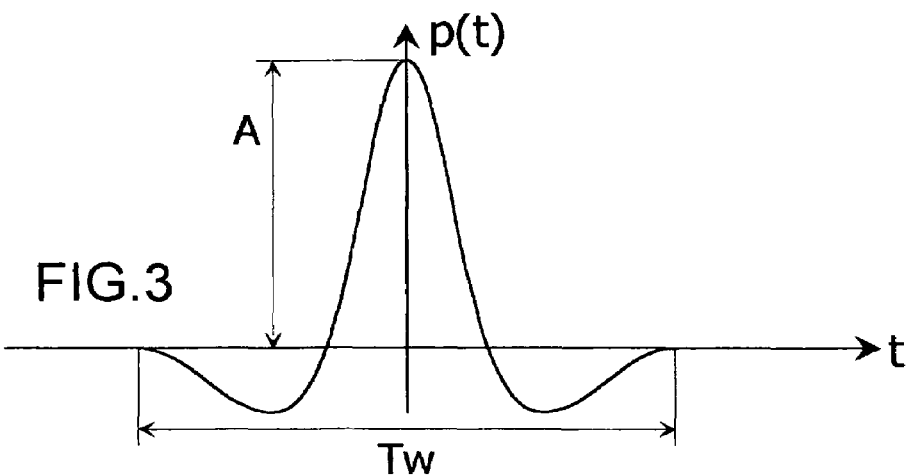
FIG. 3 is a chronogram depicting a pulse model which may be used for generating such a sequence.

FIG. 3 is another chronogram which depicts a possible shape p(t) which may be chosen for constituting the above-mentioned pulses. Pulses pj(t) (for j=1 to Ns) of a same sequence may have different shapes, provided that they all have essentially a same width and carry a same quantity of energy. All pulses pj(t) (for j=1 to Ns) belonging to a same sequence may, however, have a same shape such as the shape p(t) depicted here, which is defined as a derivative of the second order of a Gaussian function, which may be expressed mathematically as $p(t)=A.[1-4\pi(t/Tw)^2].\exp(-2\pi(t/Tw)^2)$. Other pulse shapes known to those skilled in the art may, of course, be used in this same purpose.

Figure 4:
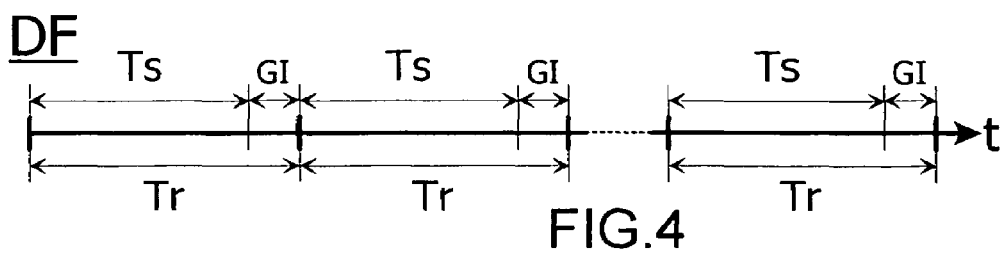
FIG. 4 is a chronogram depicting a data frame including a plurality of pulse sequences.

FIG. 4 is yet another chronogram which depicts a dataframe DF formed by successive pulse sequences such as the one described above, each having a total duration Ts, a guard interval GI being periodically inserted between two such sequences in order to prevent alteration of a given sequence by a following one, which alterations could be caused, for example, by intermodulation products between said pulse sequences. This dataframe DF is thus constituted by successive frames having each a duration Tr, with Tr=Ts+GI, and including each a pulse sequence as described above.

In particular applications, the signature of any given transmitter may be dynamically generated within said transmitter and may thus vary from one pulse sequence to another. Such a signature may for example be generated by means of a specific control of a pre-programmed shiftable register. In such applications, any given receiver must be able to re-generate each signature corresponding to each pulse sequence, which may be achieved by providing said receiver with a shiftable register to be pre-programmed and controlled according to instructions sent beforehand to said receiver by a control infrastructure of the telecommunication system, e.g. in the form of Medium Access Control signals.

A device intended to receive such a data frame DF must thus only be able to measure quantities representative of the successive amounts of power carried by the successive pulse sequences, in order to identify the informational content of the dataframe DF, without having to map precisely, with respect to time, the received pulse sequences.

Figure 5:
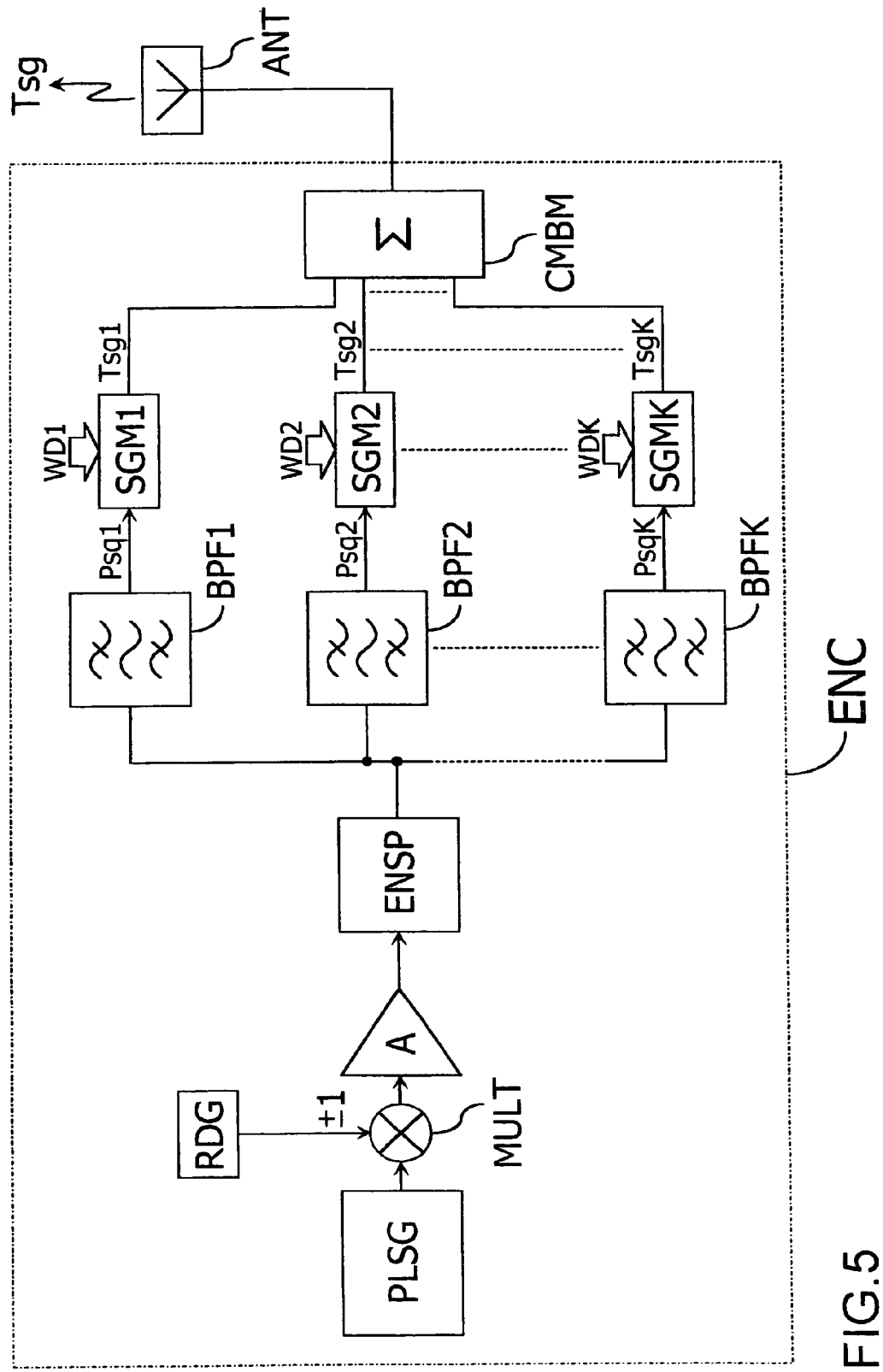
FIG. 5 is a block diagram depicting symbol encoding means according to a variant of the invention.

FIG. 5 diagrammatically shows symbol encoding means ENC included in a transmitter according to a preferred variant of the invention. These symbol encoding means ENC are essentially constituted by a signal encoder including:

- a single pulse generator PLSG for producing a series of pulse sequences,
- a random binary generator RDG for randomly generating values equal to +1 or −1 with which successive pulses of a pulse sequence are to be multiplied by a mixer MULT,
- an amplifier A for boosting the output signal of said mixer MULT,
- an energy splitter ENSP for spreading the energy carried by said output signal into K sub-bands; and
- a parallel array of K band-pass filters BPFk (for k=1 to K), each of which being intended to extract a specific pulse sequence Psqk from the amplified output signal of the mixer MULT, each specific pulse sequence Psqk thus corresponding to one of K sub-bands into which the total bandwidth available for transmission has been divided.

According to this variant of the invention, the symbol encoding means ENC also include K signal multipliers SGMk (for k=1 to K), for multiplying each specific pulse sequence Psqk with a tunable coding value representative of a symbol to be carried by said pulse sequence Psqk, which tunable coding value is represented by a control word WDk.

The resulting encoded pulse sequences Tsgk (for k=1 to K) outputted by the signal multipliers SGMk are then to be recombined by signal combination means CMBM, for example a voltage additioner, into a signal Tsg to be transmitted by means of a transmitting antenna ANT.

This particular embodiment of the invention enables to transmit simultaneously K symbols, by means of K encoded specific pulse sequences Tsgk (for k=1 to K), through a same communication channel. This particular embodiment is also remarkable in that the signal encoder, though including a single pulse generator PLSG, is able to generate multiple encoded pulse sequences Tsgk.

In a variant of the above-described embodiment, the encoding means ENC may include multiple signal encoders like the one shown in the present Figure and described hereinbefore, each of which signal encoders including a single pulse generator and multiple band-pass filters and signal multipliers. Such a variant may be especially useful for building a multi-network transmitter, each signal encoder included in such a transmitter being than dedicated to one of said networks.

According to a variant of the above-described embodiment, all signal multipliers SGMk (for k=1 to K) included in a same signal encoder will preferably be essentially identical to each other, at least two signal multipliers being controllable by a same control word in order to produce information redundancy on at least two different sub-bands.

This variant of the above described embodiment of the invention will enable to easily introduce transmission redundancy in cases where a communication channel to be used for said transmission has been identified as featuring a low signal-to-noise ratio. This variant thus allows a simple and flexible tuning of the throughput of an UWB telecommunication system as a function of the quality of the communication conditions within said system.

Figure 6:
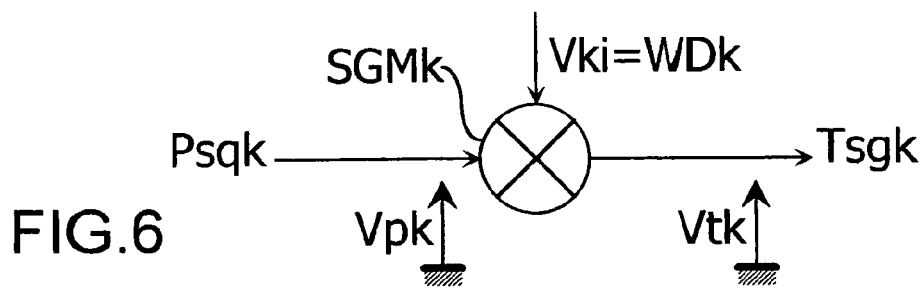
FIG. 6 is a block diagram depicting a possible embodiment of signal multipliers used in such symbol encoding means.

FIG. 6 diagrammatically shows a signal multiplier SGMk according to a possible embodiment of the invention, according to which each specific pulse sequence Psqk is formed by a specific signal Vpk, for example a voltage signal. The signal multiplier SGMk shown here consists in a mixer built on the basis of a Gilbert cell, which is a simple and well-known analog circuit designed for mixing together two analog signals by means of three differential pairs of transistors, and for outputting a product signal Vtk resulting from such a mixing. In this embodiment of the invention, the control word WDk is equal to the tunable coding value Vki and may be greater than one, in which case the signal multiplier SGMk will act as an amplifier. The tunable coding value Vki may also be smaller than one, in which case the signal multiplier SGMk will act as an attenuator or divider.

Figure 7:
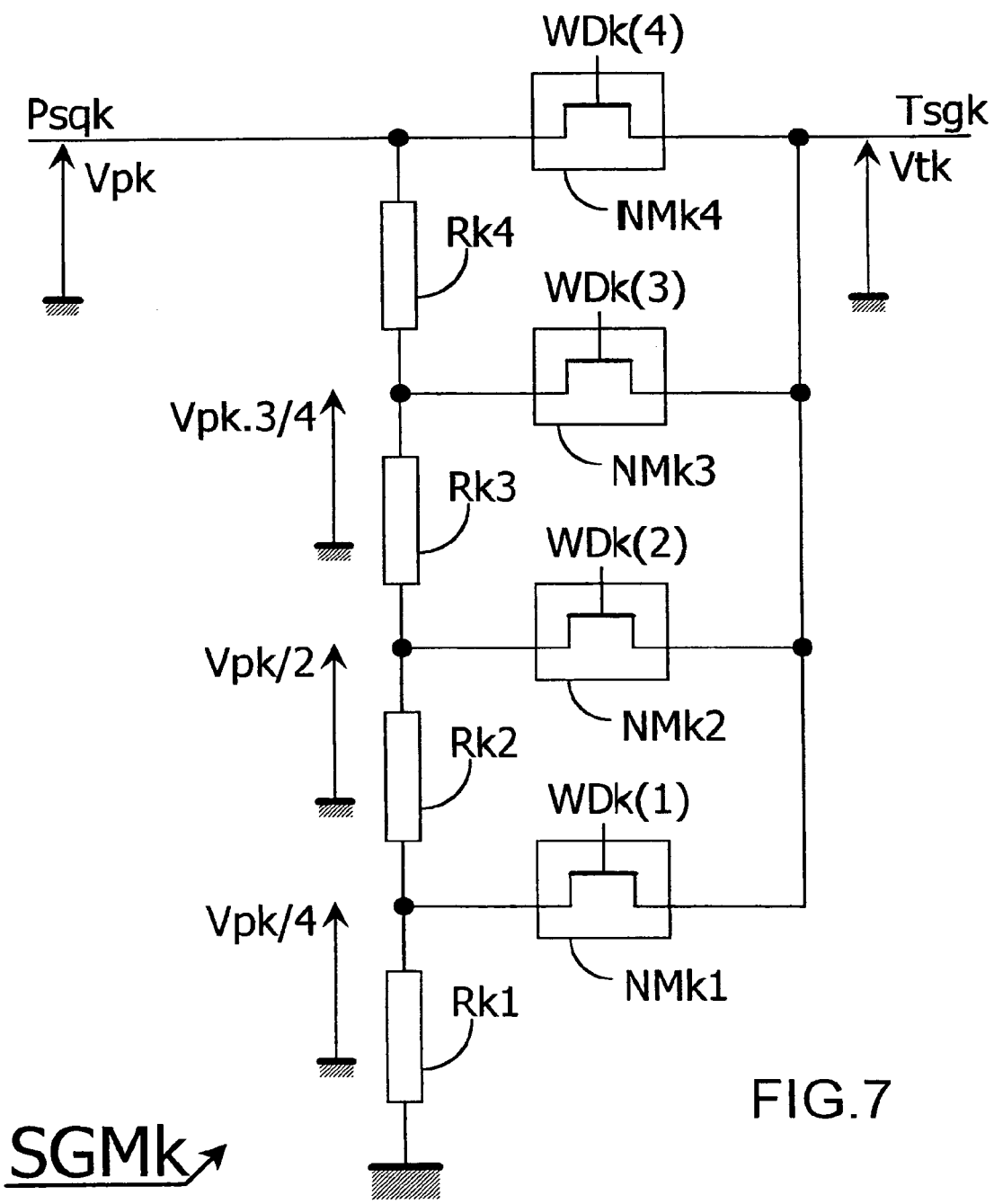
FIG. 7 is a schematic diagram depicting an advantageous embodiment of signal multipliers used in such symbol encoding means.

FIG. 7 depicts a signal multiplier SGMk according to an advantageous embodiment of the invention, in which each specific pulse sequence Psqk (for k=1 to K) consists in a voltage signal Vpk, and the tunable coding value Vki is smaller than or equal to one, the signal multiplier being then intended to deliver an output voltage signal Vtk whose amplitude will have been divided with respect to the amplitude of the inputted voltage signal Vpk.

This signal multiplier SGMk thus essentially consists in a dividing bridge formed in this particular example by four series-arranged resistors Rkm (for m=1 to 4) having preferably a same nominal value, each resistor Rkm having one terminal connected to an output of the signal multiplier SGMk via a selector NMk(m) formed by an NMOS transistor controlled by one bit WDk(m) of control word WDk.

If only the mth bit WDk(m) of said control WDk is equal to 1 at any given time, the voltage Vtk outputted by this signal multiplier SGMk will be equal to Vpk.m/4, in which case the pulse sequence Tsgk will be multiplied with a coding value Vki equal to m/4, which is easily tunable by programmation of the value of the control word WDk.

The invention claimed is:

1. A telecommunication system for transmitting information from at least one transmitter to one receiver, said at least one transmitter being configured to transmit the information in a signal formed by at least one pulse sequence of Ns pulses over Ns time windows, each pulse being enclosed within a time chip whose position within a corresponding time window is defined by a chip number, wherein the at least one transmitter includes a symbol encoding unit configured to encode said information, the symbol encoding unit comprising:
   at least one pulse generator configured to produce said at least one pulse sequence; and
   at least one signal multiplier configured to multiply said at least one pulse sequence, produced by the at least one pulse generator, with a tunable coding value, wherein the tunable coding value is representative of a symbol of the information to be transmitted to the receiver.

2. The telecommunication system as claimed in claim 1, wherein the symbol encoding unit further comprises a random binary generator configured to randomly generate values equal to +1 or −1 with which successive pulses of the at least one pulse sequence are to be multiplied.

3. The telecommunication system as claimed in claim 1, wherein the symbol encoding unit further comprises a time-delaying unit configured to subject all pulses of a same pulse sequence of the at least one pulse sequence produced by the at least one pulse generator to a time jitter.

4. The telecommunication system as claimed in claim 1, wherein the symbol encoding unit further comprises:
   at least one signal encoder, each of the at least one signal encoder comprising one of the at least one pulse generator and an energy splitting unit configured to dispatch a single basic pulse sequence delivered by said one of the at least one pulse generator into at least two specific sequences to be transmitted within respective frequency sub-bands into which a total bandwidth available for transmission is divided by a filtering unit, said at least one signal encoder further comprising at least two of the at least one signal multiplier configured to multiply each specific pulse sequence with the tunable coding value representative of the symbol of information to be carried by said specific pulse sequence, said at least one signal encoder also comprising a signal combination unit configured to combine all the specific pulse sequences delivered by all the signal multipliers into the signal to be transmitted.

5. The telecommunication system according to claim 4, wherein all the signal multipliers included in a same one of the at least one signal encoder are substantially identical to each other, the at least two of the at least one signal multiplier being controllable by a same control word in order to produce information redundancy on at least two different sub-bands.

6. The telecommunication system as claimed in claim 1, wherein said at least one signal multiplier is configured to multiply said at least one pulse sequence with the tunable coding value by multiplying each of the Ns pulses in the at least one pulse sequence with the same tunable coding value, the at least one pulse sequence multiplied with the tunable coding value having a power that is representative of the symbol of the information to be transmitted to the receiver.

7. A telecommunication system including at least one transmitter and one receiver, said at least one transmitter being configured to transmit a signal formed by at least one pulse sequence of Ns pulses over Ns time windows, each pulse being enclosed within a time chip whose position within a corresponding time window is defined by a chip number, wherein the at least one transmitter includes a symbol encoding unit comprising:
   at least one pulse generator configured to produce said at least one pulse sequence; and
   at least one signal multiplier configured to multiply said at least one pulse sequence, produced by the at least one pulse generator, with a tunable coding value representative of a symbol to be carried by said at least one pulse sequence, wherein
   said at least one pulse sequence includes a voltage signal having a predetermined amplitude, the tunable coding value being smaller than or equal to one, the at least one signal multiplier includes a voltage divider configured to divide said predetermined amplitude by a value, which is tunable by means of a control word representative of the tunable coding value.

8. The telecommunication system as claimed in claim 7, wherein said at least one signal multiplier is configured to multiply said at least one pulse sequence with the tunable coding value by multiplying each of the Ns pulses in the at least one pulse sequence with the same tunable coding value, the at least one pulse sequence multiplied with the tunable coding value having a power that is representative of the symbol to be carried by said at least one pulse sequence.

9. A device for transmitting information, to a receiver, in a signal formed by at least one sequence of Ns pulses over Ns time windows, each pulse being enclosed within a time chip whose position within a corresponding time window is defined by a chip number, wherein the device includes a symbol encoding unit configured to encode said information, the symbol encoding unit comprising:
   at least one pulse generator configured to produce said at least one pulse sequence; and
   at least one signal multiplier configured to multiply said at least one pulse sequence, produced by the at least one pulse generator, with a tunable coding value, wherein the tunable coding value is representative of a symbol of the information to be transmitted to the receiver.

10. The device as claimed in claim 9, wherein said at least one signal multiplier is configured to multiply said at least one pulse sequence with the tunable coding value by multiplying each of the Ns pulses in the at least one pulse sequence with the same tunable coding value, the at least one pulse sequence multiplied with the tunable coding value having a power that is representative of the symbol of the information to be transmitted to the receiver.

* * * * *